United States Patent [19]

Fukushima et al.

[11] Patent Number: 4,457,409
[45] Date of Patent: Jul. 3, 1984

[54] VORTEX SHOCK ABSORBER WITH ABSORBING FORCE RELIEF MEANS

[75] Inventors: Naoto Fukushima, Fujisawa; Kazuroh Iwata, Kamakura; Kunihiko Hidaka, Yokohama, all of Japan

[73] Assignee: Nissan Motor Company, Limited, Yokohama, Japan

[21] Appl. No.: 325,417

[22] Filed: Nov. 27, 1981

[30] Foreign Application Priority Data

Nov. 28, 1980 [JP] Japan .................................. 55-168941

[51] Int. Cl.³ .................................................. F16F 9/34
[52] U.S. Cl. .................................. 188/282; 137/513.3; 137/808; 188/315; 188/317; 188/322.14; 188/322.15
[58] Field of Search ................ 188/269, 275, 280, 281, 188/282, 286, 314, 315, 316, 317, 318, 319, 320, 322.15, 322.14, 322.13, 322.5, 301, 279, 311; 137/808–813, 513.3–513.7; 267/64.15

[56] References Cited

U.S. PATENT DOCUMENTS

| | | | |
|---|---|---|---|
| 2,735,515 | 2/1956 | Cloudsley | 188/282 |
| 3,180,453 | 4/1965 | Murata | 188/322.14 |
| 3,220,517 | 11/1965 | Lorenz | 188/318 |
| 3,651,902 | 3/1972 | Peddinghaus | 188/314 X |
| 4,082,169 | 4/1978 | Bowles | 188/322.11 |

FOREIGN PATENT DOCUMENTS

| | | |
|---|---|---|
| 876047 | 5/1953 | Fed. Rep. of Germany . |
| 1156218 | 6/1969 | United Kingdom . |
| 2044882 | 10/1980 | United Kingdom . |

*Primary Examiner*—Douglas C. Butler
*Attorney, Agent, or Firm*—Schwartz, Jeffery, Schwaab, Mack, Blumenthal & Koch

[57] ABSTRACT

A shock absorber is provided with a relief valve within a thrusting piston. The relief valve defines a vortex chamber therein and is movable in response to the pressure difference between a high pressure chamber and a lower pressure chamber. The valve is movably urged toward an initial position by a set spring which defines the set pressure of the shock absorber.

35 Claims, 8 Drawing Figures

VORTEX SHOCK ABSORBER WITH ABSORBING FORCE RELIEF MEANS

BACKGROUND OF THE INVENTION

The present invention relates generally to a hydraulic shock absorber producing a vortex fluid flow therein for absorbing shock by resisting fluid flow therethrough. More particularly, the invention relates to a vortex flow shock absorber having relief means for relieving absorbing forces when the force produced by the shock absorber exceeds a predetermined value.

A hydraulic vortex-flow shock absorber is used, for example, in an automotive vehicle suspension for absorbing or damping road shock, rolling forces, pitching forces and so on. An absorber used with a vehicle suspension must provide not only sufficient absorbing force for stability of the vehicle but also respond gently enough not to give a rough ride. Therefore, the conventional vortex-flow shock absorber is provided with a relief valve for relieving excessive hydraulic pressure in order to prevent excessive absorbing force.

The relief valve of a conventional shock absorber is always subject to fluid pressure and must prevent the pressurized fluid from flowing therethrough while the fluid pressure is below the predetermined set pressure. Thus, the relief valve itself is necessarily stiff, which limits its response characteristics to fluid pressure greater than the set pressure. This may result in the maintenance of excessive pressure between the high pressure section and low pressure section due to insufficient relief effect. Furthermore, conventional relief valves open incompletely in response to a relatively high fluid pressure exceeding the set pressure which causes resistance to fluid flow therethrough due to an orifice effect. This unnecessarily increases the shock absorbing force and results in a rough ride.

SUMMARY OF THE INVENTION

Therefore, it is an object of the present invention to provide a vortex flow shock absorber which can relieve excessive fluid pressure effectively and keep the fluid pressure in the shock absorber lower than the set pressure.

Another object of the present invention is to provide a relief means for a vortex flow shock absorber which can effectively and successfully relieve fluid pressure in excess of the set pressure.

To achieve the above-mentioned and other objects of the invention, a shock absorber is provided with a relief valve within a thrusting piston. The relief valve defines a vortex chamber therein and is movable in response to the pressure difference between a high pressure chamber and a lower pressure chamber. The valve is movably urged toward an initial position by a set spring which defines the set pressure of the shock absorber.

According to one embodiment of the invention, there is provided a vortex flow shock absorber comprising:

a hollow cylindrical tube defining therein a fluid chamber filled with a working fluid, a piston movably disposed within the fluid chamber to divide the fluid chamber into first and second chambers, the piston having therein a circular bore opening into either the first or the second chamber, a valve body movably disposed within said circular bore and having therein a circular vortex chamber in which vortex flow of the working fluid is produced, the valve body defining vortex passages for communicating between the vortex chamber and one of said first and second chambers and a central passage for communicating between the vortex chamber and the other of said first and second chambers, and a resilient member disposed within the circular bore to constantly bias said valve body toward the open end of said circular bore, said resilient member being responsive to the fluid flow in a first direction in which the fluid flows into said vortex chamber via the central opening of the valve body to form a clearance between the edge portion of the open end and the valve body through which to permit the pressurized fluid to flow.

BRIEF DESCRIPTION OF THE DRAWINGS

The present invention will become fully understood from the detailed description given herebelow and from the accompanying drawings of the preferred embodiment of the present invention, which, however, should not be taken as limitative to the invention but for elucidation and explanation only.

In the drawings.

DESCRIPTION OF THE PREFERRED EMBODIMENT

Figure 1:
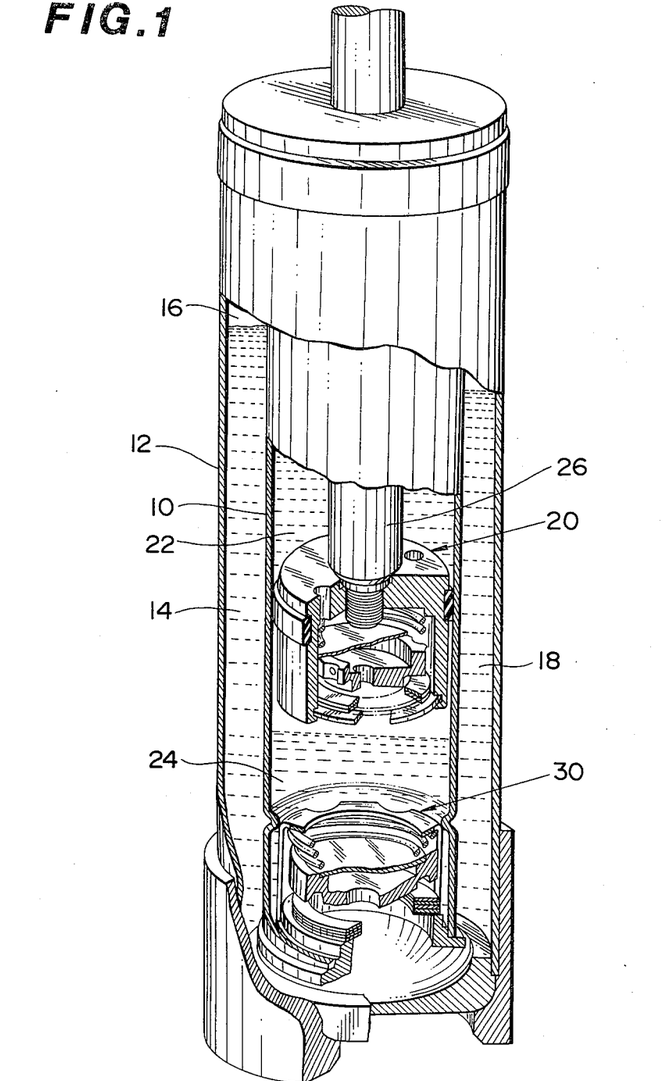
FIG. 1 is a perspective view of the preferred embodiment of a shock absorber according to the present invention, in which a part of the shock absorber cylinders are cut away to show an essential portion of the invention.
Figure 2:
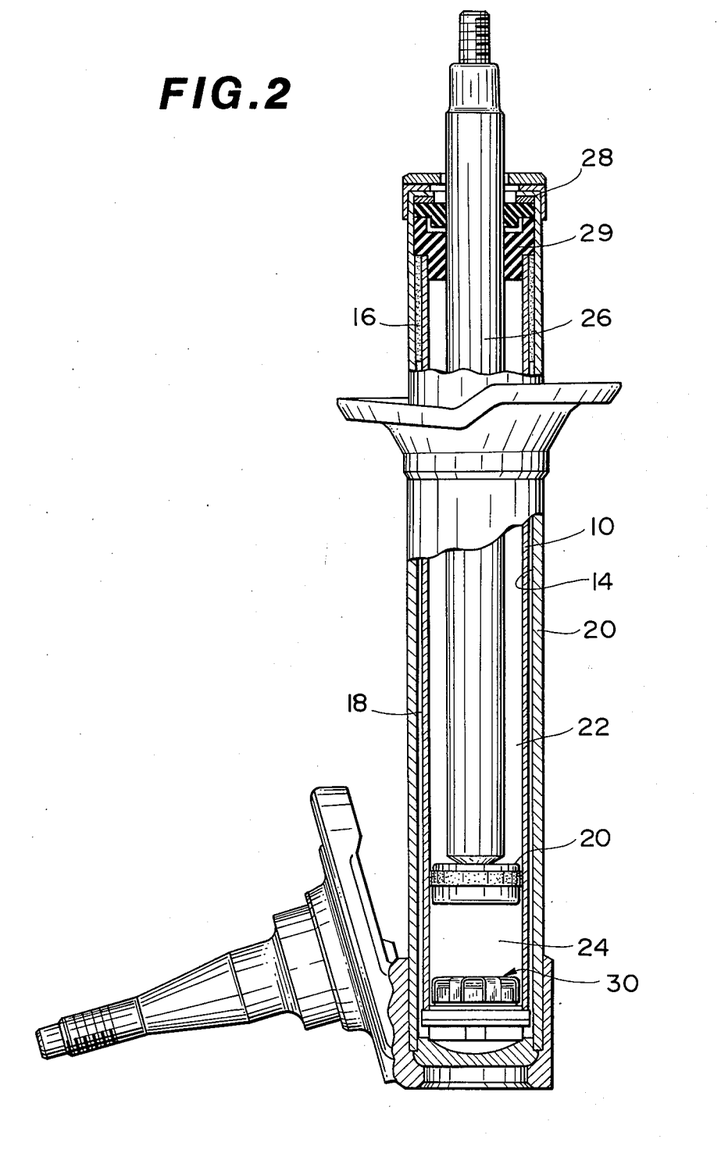
FIG. 2 is a partial longitudinal section of the shock absorber of FIG. 1.

Referring now to the drawings, particularly to FIGS. 1 and 2, there is illustrated the preferred embodiment of a shock absorber according to the present invention. The shock absorber has an inner and an outer cylindrical tubes 10 and 12 coaxially arranged with respect to each other. An annular chamber 14 is defined between the inner and outer tubes, which is divided into a pneumatic chamber 16 at the upper portion thereof and a fluid reservoir chamber 18 at the lower portion thereof. A piston 20 is movably disposed within the inner tube 10 to divide the internal space of the inner tube into first upper and second lower chambers 22 and 24. The piston 20 is secured to the lower end of a piston rod 26 slidably passing through sealers 28 and 29 at the top of the inner tube 10. The lower end of the inner tube 10 is closed with a bottom fitting 30.

Figure 3:
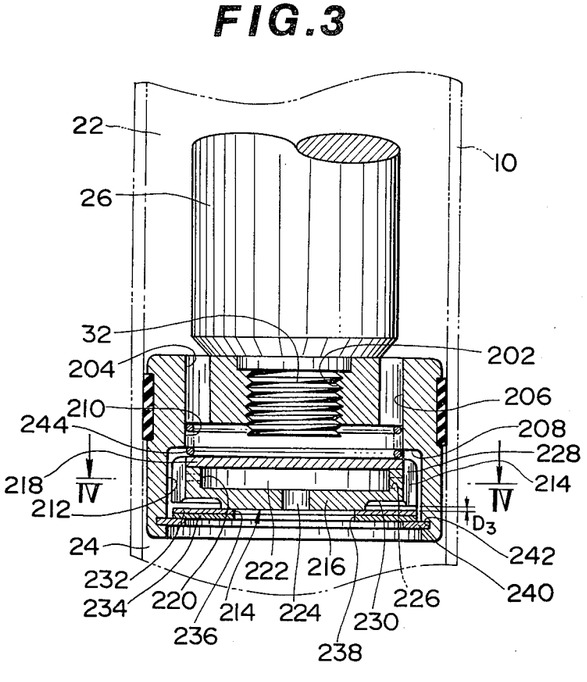
FIG. 3 is an enlarged view of a longitudinal section of a piston disposed in the shock absorber of FIG. 1.
Figure 4:
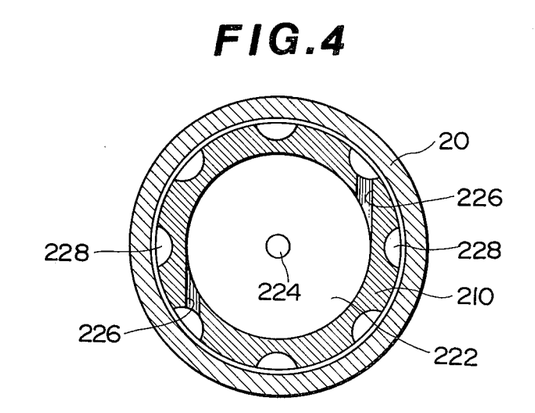
FIG. 4 is a cross-section taken along line IV—IV of FIG. 3.
Figure 5:
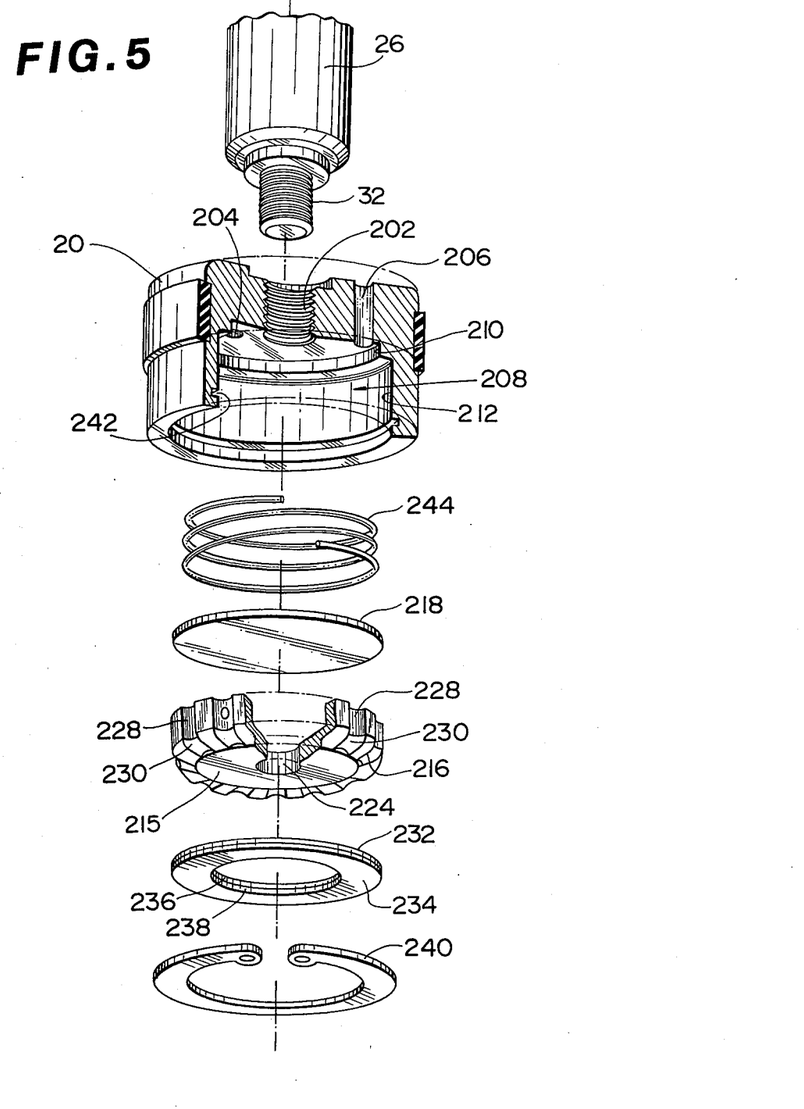
FIG. 5 is an exploded perspective view of the piston of FIG. 3.

As shown in FIGS. 3 to 5, the piston 20 is formed with a central threaded opening 202 to which the threaded end 32 of the piston rod 26 is engaged. Near the threaded opening 202, a pair of vertical through openings 204 and 206 are formed in the piston. The through openings establish communication between the first chamber 22 and circular bore 208 formed on the lower portion of the piston 20. The bore 208 includes an upper smaller diameter section 210 and a lower larger-diameter section 212. A movable valve body 214 is movably disposed within the section 212 of the bore 208. The valve body 214 comprises a dish-shaped member 216 and a disc-shaped member 218. The dish-shaped member 216 is formed with a circular bore 220 on its upper surface, so that the dish-shaped member 216 is concave upward. The dish-shaped member 218 is mounted on the rim of the dish-shaped member 216 to close the bore 220 and define therein a vortex chamber 222. The dish-shaped member 216 has an opening 224 at the center of the bottom thereof. The opening 224 establishes communication between the vortex chamber 222 and the second chamber 24.

The vortex chamber in turn communicates with the first chamber 22 via the vertical through openings 204 and 206, the bore 208 and a pair of vortex passages 226 formed through the side wall of the valve body 214 and opening normal to the radius of the valve body 214 at the inner ends thereof. The outer ends of the vortex passages 226 open to vertical grooves 228 formed on the periphery of the valve body 214. The vertical grooves 228 are respectively connected to horizontal grooves 230 radially formed on the bottom surface of the valve body 214. The horizontal grooves 230 end at a central projection 215 on the bottom surface of the valve body 214.

The central projection 215 of the valve body 214 normally rests on annular spring discs 232 and 234 having central openings 236 and 238. The annular spring discs 232 and 234 are chosen so as to be sufficiently deformable at a predetermined pressure to contact the bottom surface of the valve body 214 at its edge instead of at the central projection 215. Specifically, they must deform by more than the height D3, as indicated in FIG. 3, of the central projection 215 at the edge thereof. The annular spring discs are fitted together and rest on a snap ring 240 which is secured to the internal periphery of the larger diameter section 212 by engagement within a groove 242 running all the way around the larger diameter section 212. The valve body 214 is urged toward the spring discs 232 and 234 by a coil spring 244, one end of which abuts the upper surface of the valve body and the other end of which abuts the ceiling of the bore 208 of the piston 20.

Figure 6:
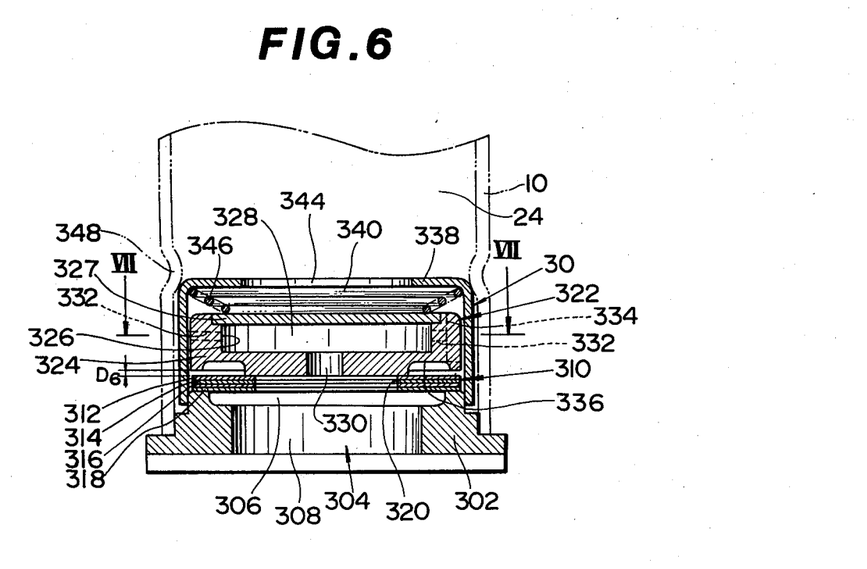
FIG. 6 is an enlarged longitudinal section of a bottom fitting of the shock absorber of FIG. 1.
Figure 7:
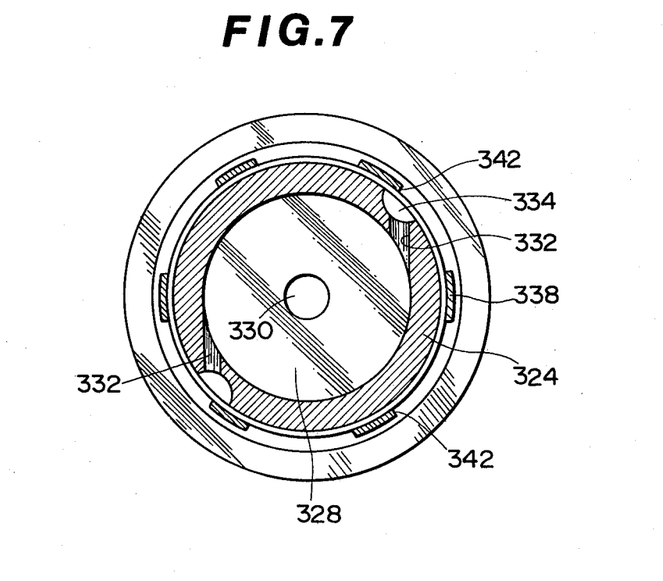
FIG. 7 is a cross-section taken along line VII—VII of FIG. 6.
Figure 8:
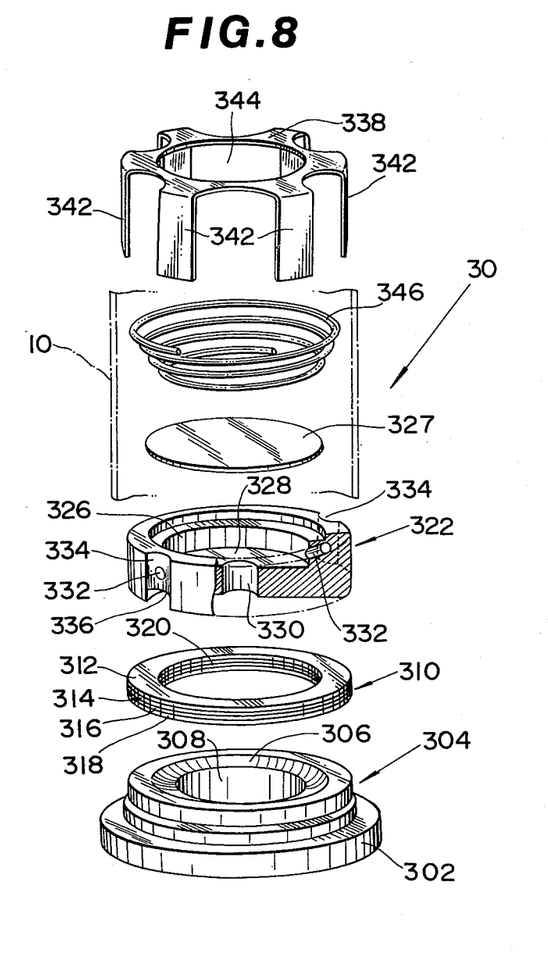
FIG. 8 is a perspective view of the bottom valve of FIG. 6.

FIGS. 6 to 8 illustrate a preferred embodiment of the bottom valve 30 used in the shock absorber of FIGS. 1 and 2. The bottom valve generally comprises a fitting 302 having a stepped opening 304 having an upper first section 306 and a lower second section 308 of smaller diameter than that of the first section. A leaf spring assembly 310 including annular leaf springs 312, 314, 316 and 318 rests on the upper end of the fitting 302. The leaf spring assembly 310 has an aperture 320 at the central portion thereof. A movable valve body 322 rests on the spring assembly 310. The valve body 322 has dish-shaped member 324 having a bore 326 on the upper surface thereof and a closure disc 327 fixed at the top of the dish-shaped member 324 for closing the upper end of the bore 326 so that together they define a vortex chamber 328 in the valve body. The vortex chamber 328 communicates with the fluid reservoir chamber 18 via a central opening 330 formed in the valve body and the aperture 320 formed in the spring assembly 310. On the other hand, the vortex chamber 328 communicates with the second chamber 24 via a pair of vortex passages 332 which open into the vortex chamber 328 normal to the radius thereof. The other end of the vortex passages 332 open into vertical grooves 334 formed on the periphery of the valve body. The vertical groove 334 connects to a horizontal groove 336 formed on the bottom of the valve body 322, and ending at a central projection 335 of the valve body 322. As explained with regard to the piston 20, the dimensions of the bottom surface of the valve body 322 and the spring assembly 310 must be selected such that at a predetermined fluid pressure downward, the spring assembly 310 will deform enough to unseat the central projection 335 and thus open the horizontal groove 336.

A cover member 338 with bore 340 facing downward is movably fitted to the circumference of the fitting 302 and houses therebetween the valve member 322. The cover member 338 has a plurality of slots 342 and a central opening 344 for communication between the second chamber 24 and the bore 340. A bias spring 346 is disposed within the cover member 338, one end of which abuts the upper surface of the valve member 322 and the other end of which abuts the ceiling of the cover member. The spring 346 urges the valve member 322 toward the spring assembly 310. The inner tube 10 has an inwardly depressed groove 348 serving as a stopper for the cover member 338.

In the initial position, the piston 20 is positioned at the neutral position thereof. At this position, the valve body 214 is urged towards the spring discs 232 and 234 by the spring 244. The spring force delivered by the spring 244 defines a set force corresponding to a set pressure above which to relieve fluid pressure while the piston 20 moves. Likewise, the valve body 322 is urged toward the spring assembly 310 by the spring 346 at a set pressure.

In the compression stroke, the piston 20 moves downwards so that pressure in the second chamber 24 is thus increased and the fluid pressure in the first chamber 22 is decreased by expansion of its volume. Therefore, the fluid in the second chamber 24 flows into the vortex chamber 222 via the central opening 224. The fluid flowing into the vortex chamber 222 flows therethrough and flows into the first chamber 22 via the vortex passages 226, bore 208 and openings 206 and 204. At this time, upward force is applied to the bottom of the valve body 214 by the increased fluid pressure in the second chamber 24. If the fluid pressure in the second chamber 24 is increased so much so that it exceeds the set pressure determined by the spring 244, the valve body 214 moves upwards with respect to the springs 232 and 234 to permit the pressurized fluid in the second chamber 24 to flow through the clearance formed between the bottom of the valve body 214 and the upper surface of the spring disc 232. Here, the set pressure of the spring 244 is only for urging the valve body 214 toward the spring discs 232 and 234 and therefore is easily overcome by the fluid pressure.

At the same time, the pressurized fluid in the second chamber 24 also flows into the vortex chamber 328 of the bottom fitting 30 via the slots 342 and the vortex passages 332. Thus, vortex flow of the pressurized fluid is produced within the vortex chamber 328 to resist fluid flow therethrough. The fluid in the vortex chamber 328 then flows into the fluid reservoir chamber 18 to increase the fluid pressure therein. This causes a reduction in the volume of the pneumatic chamber 16.

Here, it should be appreciated that amount of fluid in flowing from the second chamber 24 to the reservoir chamber 18 is approximately the same as the increased piston rod volume in the first chamber 22.

During this valve motion, the valve body 214 moves upwards within the piston 20 in response to excessive fluid pressure in the second chamber 24 so that substantially no resistance to fluid flow from the second chamber to the first chamber is produced. To accomplish this, the set pressure of the spring 244 is preselected to have a suitably small force against the valve body motion.

If, during the compression stroke the speed of the piston 20 exceeds a predeterminded value so that the fluid pressure in the second chamber 24 exceeds a given value, the fluid pressure pressing the valve body 322 becomes greater than the spring force of the spring assembly 310 to deform the latter downwardly. This establishes communication between bore 340 and the fluid reservoir chamber 18 to permit the pressurized fluid in the bore 340 to flow into the fluid reservoir chamber 18 via grooves 336 and 334.

In the expansion stroke, the piston 20 moves upwards to compress the first chamber volume to increase the fluid pressure therein and to expand the second chamber volume to decrease the fluid pressure therein. Therefore, the pressurized fluid in the first chamber 22 flows through the openings 204 and 206 and vortex passages 226 into the vortex chamber 222. Since the fluid in the vortex chamber 222 is discharged in a direction normal to the radius of the chamber, vortex flow is produced thus creating resistance to fluid flow therethrough. This force of resistance serves as the absorbing force against the shock applied to the shock absorber. The fluid in the vortex chamber 222 flows through the opening 224 to the second chamber 24.

At the same time, due to relatively low pressure in the second chamber 24, the valve body 322 is moved upwards to create a clearance between the upper surface of the spring assembly 310 and the lower end of the valve body 322. The pressurized fluid in the fluid reservoir chamber 18 is thus permitted to flow into the second chamber via the slots 342.

If the piston 20 travels faster than a predetermined value in the expansion stroke to compress the fluid in the first chamber 22 to a pressure greater than a given value, the fluid pressure in the bore 208 exceeds the set pressure of the spring discs 232 and 234 to deform them downward. This establishes communication between the bore 208, the first chamber 22 and the second chamber 24 via the grooves 230 and 228.

As described in detail, the shock absorber according to the present invention can effectively prevent extremes of fluid pressure caused by the piston stroke so as to prevent damage which might lead to introduction of air, resulting in lower overall fluid pressure and less effective shock absorbing function in the shock absorber. Thus, the invention fullfils all of the objects and advantages sought therefor.

What is claimed is:

1. A vortex flow shock absorber comprising:
an outer hollow cylindrical tube;
an inner hollow cylindrical tube coaxially disposed within said outer tube to define therebetween an annular chamber;
a piston movably disposed within said inner tube to define first upper and second lower chambers within said inner tube, said piston being attached to a lower end of a slidable piston rod and having a first circular bore opening downwardly on a surface opposing said second chamber;
a first valve member movably disposed within said circular bore and defining therein a first vortex chamber in which vortex fluid flow is produced, said valve member having a vortex passage extending through a periphery thereof and opening into the first vortex chamber in a direction normal to a radius thereof, said valve member further having a central opening formed substantially at a center of a bottom thereof;
a first bypass passage bypassing said first vortex chamber;
a first resilient member disposed within said circular bore and above said first valve member to urge said first valve member toward an open end of said first circular bore, said first resilient member being compressed in response to fluid flow in a direction from said second chamber to said first chamber to permit the first valve member to move upwards to open said first bypass passage;
a bottom fitting attached to a lower end of said inner tube and having therein a circular chamber, said circular chamber establishing communication between said second chamber and said annular chamber;
a second valve member disposed within said circular chamber and defining therein a second vortex chamber for producing vortex fluid flow, said second vortex chamber communicating with said circular chamber via a second vortex passage and a central opening, said second vortex passage permitting fluid flow from said second chamber to said second vortex chamber to produce vortex fluid flow therein;
a second bypass passage bypassing said second vortex chamber; and
a second resilient member disposed within said circular chamber above said second valve member for constantly urging said second valve member downwardly, said second resilient member being compressed in response to fluid flow from said annular chamber to said second chamber to permit the second valve member to move upwards to open said second bypass passage.

2. A shock absorber as set forth in claim 1, wherein said second valve member rests on a third resilient member fixed on a circumference of said bottom fitting, said second valve member having grooves extending along a vertical periphery and bottom thereof, said grooves comprising at least a part of said second bypass passage and being operable for establishing communication between said second vortex chamber and a chamber of the inner tube below the second valve member when said third resilient member is depressed as a result of fluid pressure in said second chamber exceeding a preset pressure determined by said third resilient member.

3. The shock absorber of claim 1, further comprising a fourth resilient member fixed on a circumference of said piston below said first valve member, said first bypass passage comprising grooves extending along a vertical periphery and bottom of said first valve member, said grooves establishing fluid communication between said first vortex chamber and said second chamber when said first resilient member is depressed as a result of fluid pressure from said first circular bore exceeding a preset pressure determined by said first resilient member.

4. A hydraulic shock absorber comprising:

an outer cylinder;

an inner cylinder coaxially disposed within said outer cylinder and defining a fluid reservoir chamber therebetween, said inner cylinder being filled with a working fluid;

a piston disposed within said inner cylinder for reciprocal movement along an axis of said inner cylinder, said piston defining first and second chambers within said inner cylinder, said piston being operable to establish fluid communication between said first and second chambers therethrough;

a fitting disposed on an open end of said inner cylinder and operable to establish fluid communication between said fluid reservoir chamber and said second chamber therethrough; said fitting having therein a hollow space;

a first valve body movably disposed within said hollow space and having therein a first vortex chamber operable to produce a vortex pattern fluid flow in response to a fluid flow in a first direction from said second chamber to said fluid reservoir chamber, and to produce a radial pattern fluid flow in response to fluid flow in a second direction from said fluid reservoir chamber to said second chamber;

a first pressure relief passage for establishing fluid communication between said second chamber and said fluid reservoir chamber bypassing said first vortex chamber, said first valve body being movable between a first position interrupting fluid communication between said second and fluid reservoir chambers via said first pressure relief passage and a second position establishing fluid communication between said second and fluid reservoir chambers via said first pressure relief passage;

a first resilient member operably disposed to bias said first valve body at said first position, and responsive to a fluid pressure difference between said second and fluid reservoir chambers in said first direction of fluid flow being larger than a first set pressure to allow movement of said first valve body to said second position; and a second resilient member operably disposed to bias said first valve body at said first position, and responsive to a fluid pressure difference between said second and fluid reservoir chambers in said second direction of fluid flow exceeding a second set pressure to allow movement of said first valve body to said second position.

5. A hydraulic shock absorber comprising:

an outer cylinder;

an inner cylinder coaxially disposed within said outer cylinder and defining therebetween a fluid reservoir chamber;

a piston reciprocally disposed within said inner cylinder and defining first and second chambers in said inner cylinder;

a fitting closingly disposed on an open end of said inner cylinder and operable to establish fluid communication between said second chamber and said fluid reservoir chamber, said fitting defining therein a hollow space;

a first valve body having a substantially circular first vortex chamber, said first valve body being movably disposed within said hollow space for movement between a first position and a second position, said first vortex chamber communicating with said second chamber through a first vortex passage and said fluid reservoir chamber through a first central opening for producing a vortex pattern fluid flow therein when working fluid flows in a first direction and for producing a radial pattern fluid flow therein when working fluid flows in a second direction, said first valve body and an internal periphery of said hollow space defining a first pressure relief passage bypassing said first vortex chamber for directly connecting said second chamber and said fluid reservoir chamber, said first valve body closing said first pressure relief passage in said first position thereof and opening said first pressure relief passage in said second position thereof;

a fluid pressure responsive first resilient member for biasing said first valve body towards said first position and responsive to a fluid pressure in said second chamber exceeding a first set pressure to allow the first valve body to move to said second position; and a fluid pressure responsive second resilient member for biasing said first valve body towards said first position and responsive to fluid pressure in said fluid reservoir chamber exceeding a second set pressure to allow the first valve body to move to said second position.

6. A hydraulic shock absorber comprising:

an outer cylinder;

an inner cylinder filled with a working fluid and coaxially disposed within said outer cylinder to define therebetween a fluid reservoir chamber;

a piston reciprocally disposed within said inner hollow cylinder to define first and second chambers in said inner cylinder;

a fitting closingly disposed on an open end of said inner cylinder and operable to connect said second chamber and said fluid reservoir chamber therethrough, said fitting having a hollow space therein;

a first valve body, movably disposed within said hollow space having therein a first vortex chamber in communication with said second chamber through a first vortex passage and with said fluid reservoir chamber through a central opening to produce a vortex pattern fluid flow in said first vortex chamber in response to fluid flow in a first direction from said second chamber to said fluid reservoir chamber and to produce a radial pattern fluid flow in said first vortex chamber in response to fluid flow in a second direction from said fluid reservoir chamber to said second chamber;

a first pressure relief passage for establishing fluid communication between said second chamber and said fluid reservoir chamber bypassing said first vortex chamber, said first valve body being movable between a first position blocking said first pressure relief passage, and a second position opening said first pressure relief valve and a third position establishing fluid communication between said second chamber and said fluid reservoir chamber for permitting fluid flow from said fluid reservoir chamber to said second chamber;

a first resilient member for biasing said first valve body toward said first position with a first bias force, said first resilient member being responsive to fluid pressure in said second chamber exceeding fluid pressure in said fluid reservoir chamber by said first bias force to allow movement of said first valve body to said second position; and a second resilient member for biasing said first valve body with a second bis force towards said first position, said second resilient member being responsive to fluid pressure in said fluid reservoir chamber exceeding fluid pressure in said second chamber by said second bias force to allow movement of said first valve body to said third position.

7. The shock absorber as set forth in claim 4, 5, or 6, wherein said first pressure relief passage comprises a groove formed on the outer periphery of said first valve body.

8. The shock absorber as set forth in claim 4, 5 or 6, wherein said first pressure relief passage comprises a plurality of peripheral grooves formed on the outer periphery of said first valve body, each of said grooves including a vertical component extending along a vertical periphery of said first valve body and a radial component extending along a horizontal plane of said first valve body.

9. The shock absorber as set forth in claim 8, wherein said first resilient member is a resiliently deformable plate having an edge portion seating on an end of said grooves for blocking fluid flow therethrough, said plate being responsive to a fluid pressure exceeding said first set pressure to deform to unseat said edge from said end of the grooves and thereby permit fluid flow.

10. The shock absorber as set forth in claim 9, wherein said second resilient member is a compression spring adapted to bias said first valve body towards said first resilient member with said second set pressure, said compression spring bias being overcome by a fluid pressure in said fluid reservoir chamber to allow the first valve body to unseat from said first resilient member and to permit fluid flow through said grooves from said fluid reservoir chamber to said second chamber via said hollow space.

11. The shock absorber as set forth in claim 10, wherein said piston has a chamber therein, a second valve body movably disposed within said chamber, said second valve body having a second vortex chamber communicating with said first chamber through a second vortex passage and with said second chamber through a central opening to produce a vortex pattern fluid flow in said second vortex chamber in response to fluid flow in said second direction wherein fluid flows from said first chamber to said second chamber, and to produce a radial pattern fluid flow in response to fluid flow in said first direction wherein fluid flows from said second chamber to said first chamber;

a second pressure relief passage for establishing fluid communication between said first and second chambers bypassing said second vortex chamber, said second valve body being movable between a fourth position interrupting fluid communication between said first and second chambers via said second pressure relief passage and a fifth position establishing fluid communication between said first and second chambers via said second pressure relief passage;

a third resilient member operably disposed to bias said second valve body towards said fourth position and responsive to a fluid pressure difference between said first and second chambers in said second direction of fluid flow exceeding a third set pressure to allow movement of said second valve body to said fifth position, and a fourth resilient member operably disposed to bias said second valve body towards said fourth position and responsive to a fluid pressure difference between said first and second chambers in said first direction of fluid flow being greater than a fourth set pressure to allow movement of said valve body to said fifth position.

12. The shock absorber as set forth in claim 4 or 5, wherein said first resilient member is a spring member, resiliently deformable in response to a fluid pressure exceeding said first set pressure, to allow the first valve body to move to said second position.

13. The shock absorber as set forth in claim 12, wherein said second resilient member is a spring member adapted to be compressed by a fluid pressure exceeding said second set pressure to allow said first valve body to move to said second position.

14. The shock absorber as set forth in claim 4, 5 or 6, wherein said piston has a chamber therein, and a second valve body movably disposed in said chamber, said second valve body having a second vortex chamber communicating with said first chamber through a second vortex passage and with said second chamber through a central opening to produce a vortex pattern fluid flow in said second vortex chamber in response to fluid flow in said second direction wherein fluid flows from said first chamber to said second chamber, and to produce a radial pattern fluid flow in response to fluid flow in said first direction wherein fluid flows from said second chamber to said first chamber;

a second pressure relief passage for establishing fluid communication between said first and second chamber bypassing said second vortex chamber, said second valve body being movable between a fourth position interrupting fluid communication between said first and second chambers via said second pressure relief passage and a fifth position establishing fluid communication between said first and second chambers via said second pressure relief passage;

a third resilient member operably disposed to bias said second valve body in said fourth position and responsive to a fluid pressure difference between said first and second chambers in said second direction of fluid flow exceeding a third set pressure to allow movement of said second valve body to said fifth position, and a fourth resilient member operably disposed to bias said second valve body toward said fourth position and responsive to a fluid pressure difference between said first and second chambers in said first direction of fluid flow exceeding a fourth set pressure to allow movement of said second valve body to said fifth position.

15. A hydraulic shock absorber comprising:

a hollow cylinder filled with a working fluid;

a piston disposed within said hollow cylinder for reciprocal movement along an axis of said hollow cylinder, said piston defining first and second chambers within said hollow cylinder and further having a hollow space therein;

a first valve body movably disposed within said hollow space having therein a first vortex chamber communicating with said first chamber via a vortex passage and with said second chamber via a central opening to produce a vortex pattern fluid flow in response to a fluid flow in a first direction from said first chamber to said second chamber, and to produce a radial pattern fluid flow in response to the fluid flow in a second direction from said second chamber to said first chamber;

a first pressure relief passage for establishing fluid communication between said first and second chambers bypassing said first vortex chamber, said first valve body being movable between a first position interrupting fluid communication between said first and second chambers via said first pressure relief passage and a second position establishing fluid communication between said first and second chambers via said first pressure relief passage;

a first resilient member operably disposed to bias said first valve body towards said first position, said first resilient member being responsive to a fluid pressure difference between said first and second chambers in said first direction of fluid flow exceeding a first set pressure to allow movement of said first valve body to said second position; and a second resilient member operably disposed to bias said first valve body towards said first position, said second resilient member being responsive to a fluid pressure difference between said first and second chamber in said second direction of fluid flow exceeding a second set pressure to allow movement of said valve body to said second position.

16. A hydraulic shock absorber comprising:
a hollow cylinder;
a piston having therein a hollow space and disposed to move reciprocally within said hollow cylinder, said piston defining first and second chambers in said hollow cylinder;
a first valve body movably disposed within said hollow space and having therein a substantially circular first vortex chamber, said first valve body being moveable between a first position and a second position, said first vortex chamber being in communication with said first chamber through a first vortex passage and with said second chamber through a first central passage for producing a vortex pattern fluid flow therein when a working fluid flows in a first direction and for producing a radial pattern fluid flow therein when the working fluid flows in a second direction;
a first pressure relief passage formed between said first valve body and an internal periphery of said hollow space for directly connecting said first and second chambers bypassing said first vortex chamber, said first valve body being operable to close said first pressure relief passage in said first position and to open said first pressure relief passage in said second position;
a fluid pressure responsive first resilient member operatively disposed to bias said first valve body towards said first position, and responsive to the fluid pressure in said first chamber exceeding a first set pressure to allow the first valve body to move to said second position; and
a fluid pressure responsive second resilient member operatively disposed to bias said first valve body towards said first position, and responsive to fluid pressure in said second chamber exceeding a second set pressure to allow the first valve body to move to said second position.

17. A hydraulic shock absorber comprising:
a hollow cylinder filled with a working fluid;
a piston disposed to move reciprocally within said hollow cylinder to define first and second chambers in said hollow cylinder, said piston having therein a hollow space in fluid communication with said first and second chambers;

a first valve body movably disposed within said hollow space and having therein a first vortex chamber communicating with said first chamber through a vortex passage and with said second chamber through a central passage to produce a vortex pattern fluid flow in response to fluid flow in first direction from said first chamber to said second chamber and to produce a radial pattern fluid flow in response to fluid flow in a second direction from said second chamber to said first chamber;

a first pressure relief passage for establishing fluid communication between said first and second chambers bypassing said first vortex chamber, said first valve body being movable between a first position interrupting fluid communication between said first and second chambers via said first pressure relief passage and a second position establishing fluid communication between said first and second chambers via said first pressure relief passage, and a third position establishing fluid communication between said first and second chambers for permitting fluid flow from said second chamber to said first chamber;

a first resilient member for providing a first resilient force for biasing said first valve body towards said first position, said first resilient member being responsive to a fluid pressure difference between said first and second chambers exceeding said first resilient force to allow movement of said first valve body to said second position; and a second resilient member for providing a second resilient force for biasing said valve body towards said first position, said second resilient member being responsive to a fluid pressure difference between said second and first chambers exceeding said second resilient force to allow the movement of said first valve body to said third position.

18. The shock absorber as set forth in claim 15, 16, or 17, wherein said first pressure relief passage comprises a groove formed on an outer periphery of said first valve body.

19. The shock absorber as set forth in claim 15, 16, or 17, wherein said first pressure relief passage comprises a plurality of peripheral grooves formed on an outer periphery of said first valve body, each of said grooves including a vertical component extending along a vertical periphery of said first valve body and a radial component extending along a horizontal plane of said first valve body.

20. The shock absorber as set forth in claim 19, wherein said first resilient member is a resiliently deformable plate having an edge portion seating on an end of said grooves for blocking fluid flow therethrough, said plate being responsive to a fluid pressure exceeding said first set pressure to deform to unseat said edge from said end of the grooves and thereby permit fluid flow.

21. The shock absorber as set forth in claim 20, wherein said second resilient member is a compression spring for biasing said first valve body towards said first resilient member with said second set pressure, said compression spring bias being operable to be overcome by a fluid pressure in said second chamber to allow the first valve body to unseat from said first resilient member and to permit fluid flow through said grooves from said second chamber to said first chamber via said hollow space.

22. The shock absorber as set forth in claim 15 or 16, wherein said first resilient member is a spring member, resiliently deformable in response to a fluid pressure exceeding said first set pressure to allow the first valve body to move to said second position.

23. The shock absorber as set forth in claim 22, wherein said second resilient member is a spring member adapted to be compressed by a fluid pressure beyond said second set pressure to allow said first valve body to move to said second position.

24. The shock absorber as set forth in claim 15, 16 or 17, further comprising an outer cylindrical tube coaxially disposed about said hollow cylinder and defining therebetween a third chamber;
   a fitting disposed at an end of said hollow cylinder, said fitting being operable to establish fluid communication between said second and third chambers.

25. The shock absorber as set forth in claim 24, wherein said fitting comprises a second movable valve body having therein a second vortex chamber in communication with said second chamber via a second vortex passage and with said third chamber via a second central opening so that a vortex pattern fluid flow is produced in said second vortex chamber when fluid flows from said second chamber to said third chamber and a radial pattern fluid flow is produced in said second vortex chamber when fluid flows from said third chamber to said second chamber;
   a member rigidly secured to the end of said hollow cylinder;
   a third resilient member disposed above said stationary member and operable to resiliently support said second valve body, a retainer means for biasing said second valve body against said third resilient member;
   a second bypass passage, bypassing said second vortex chamber and connecting said second and third chambers, said second valve body being movable between a fourth position interrupting fluid flow from said second chamber to said third chamber through said second bypass passage and a fifth position establishing fluid flow from said second chamber to said third chamber through said second bypass passage when a fluid pressure difference between said second and third chambers exceeds a third set pressure.

26. The shock absorber as set forth in claim 25, wherein said retainer means comprises a fourth resilient member operable to bias said second valve body towards said third resilient member with a fourth set pressure, said fourth resilient member being responsive to a fluid pressure in said third chamber being larger than said fourth set pressure to allow said second valve body to establish fluid communication between said third chamber and said second chamber through said second bypass passage.

27. The shock absorber as set forth in claim 26, wherein said second valve body and a periphery of said fitting define therebetween said second bypass passage, said second bypass passage being normally closed by said third resilient member when said second valve body is in said fourth position.

28. The shock absorber as set forth in claim 27, wherein said second bypass passage further comprises a plurality of grooves formed on an outer periphery of said second valve body.

29. A vortex flow valve in a hydraulic shock absorber having first and second chambers comprising:
   a hollow valve body having a fluid flow path therein for establishing fluid communication between said first and second chambers;
   a first means for defining a range of motion in which said valve body is movable in response to a fluid pressure difference between said first and second chambers;
   second means for producing a vortex pattern fluid flow within said valve body in response to fluid flow therethrough in a first direction from said first chamber to said second chamber and a radial pattern fluid flow in response to fluid flow therethrough in a second direction opposite to said first direction;
   third means for defining a bypass passage bypassing said valve body to provide fluid communication between said first and second chambers, said bypass passage being normally closed by said valve body in a first position thereof and opened by said valve body in a second position thereof, said valve body being shifted to said second position in response to a fluid pressure difference between said first and second chambers exceeding a predetermined set pressure; and
   fourth means for biasing said valve body towards said first position with said predetermined set pressure, said fourth means being responsive to the fluid pressure difference between said first and second chambers exceeding said predetermined set pressure to allow said valve body to move towards said second position.

30. The vortex flow valve as set forth in claim 29, wherein said valve body operates as a check valve in said first direction of fluid flow and as a pressure relief valve in said second direction of fluid flow.

31. The vortex flow valve as set forth in claim 30, wherein said fourth means comprises a first resilient member for providing a first resilient force for biasing said valve body towards said first position, said first resilient member being responsive to a fluid pressure difference between said second and first chambers exceeding said first resilient force to allow movement of said valve body to said second position, and a second resilient member for providing a second resilient force for biasing said valve body towards said first position, said second resilient member being responsive to a fluid pressure difference between said first and second chambers exceeding said second resilient force to allow movement of said valve body to said second position.

32. The vortex flow valve as set forth in claim 31, wherein said bypass passage comprises a groove formed on an outer periphery of said valve body.

33. The vortex flow valve as set forth in claim 32, wherein said bypass passage comprises a plurality of peripheral grooves formed on an outer periphery of said valve body, each of said grooves comprising a vertical component extending along a vertical periphery of said valve body and a radial component extending along a horizontal plane of said valve body.

34. The vortex flow valve as set forth in claim 31, wherein said first resilient member comprises a spring member resiliently deformable in response to a fluid pressure exceeding said first set pressure to allow the valve body to move to said second position.

35. The vortex flow valve as set forth in claim 34, wherein said second resilient member is a spring member operable to be compressed by a fluid pressure exceeding said second set pressure to allow the valve body to move said second position.

* * * * *